(No Model.)
E. F. FALCONNET.
PROCESS OF MANUFACTURING STEEL.
No. 338,723. Patented Mar. 30, 1886.
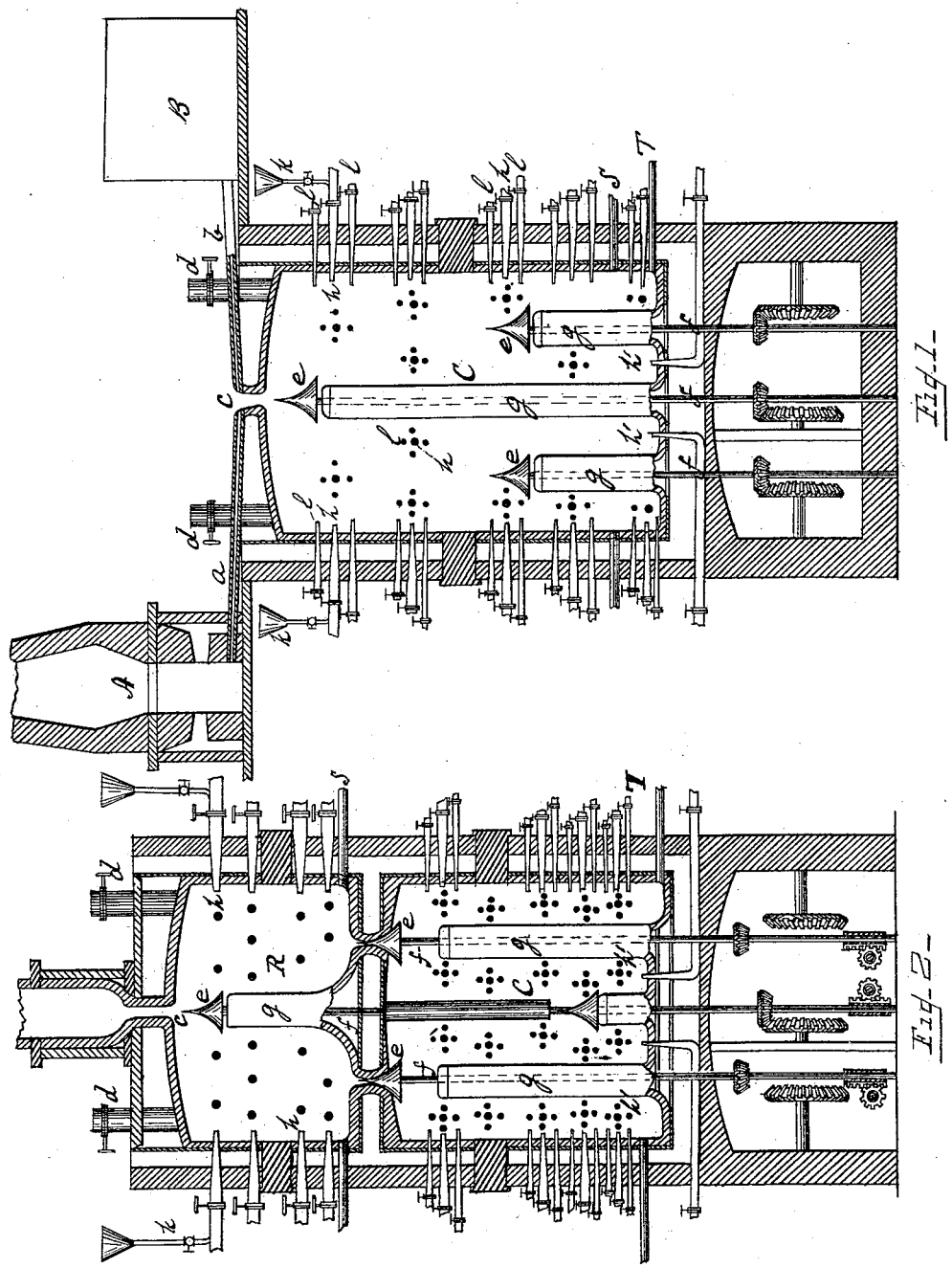

UNITED STATES PATENT OFFICE.

EUGENE F. FALCONNET, OF NASHVILLE, TENNESSEE, ASSIGNOR OF ONE-HALF TO HENRY M. PIERCE, OF SAME PLACE.

PROCESS OF MANUFACTURING STEEL.

SPECIFICATION forming part of Letters Patent No. 338,723, dated March 30, 1886.

Application filed May 18, 1885. Serial No. 165,880. (No model.)

*To all whom it may concern:*

Be it known that I, EUGENE F. FALCONNET, a citizen of the United States, residing at Nashville, in the county of Davidson and State of Tennessee, have invented a certain new and useful Improvement in the Process of Manufacturing Steel; and I hereby declare the following to be a full, clear, and exact description of the same, such as will enable others skilled in the art to practice the invention.

My present invention has for its object the treatment of the molten metal directly from the stack or blast-furnace for purposes of decarburization, desiliconization, and the elimination of sulphur, phosphorus, &c., and for the further purpose of converting the refined metal into steel, and this by a direct or continuous process or processes which will avoid the loss of material, time, and labor incident to the several steps or processes now commonly practiced.

The invention, generally stated, may be said to consist in subjecting the molten metal as it comes from the blast-furnace, when broken into spray, or in a divided condition, to the action of the air-currents charged with finely-divided basic material for purifying and refining the metal, and then subjecting said purified and refined metal, in a similarly sprayed or divided state, to the action of currents of gas, either with or without the addition of molten spiegeleisen or manganese, for transforming or converting the same into steel; and said steps may be successive and continuous, or may be blended in a single step as to point of time, accordingly as may be found most advantageous under certain circumstances.

In order that the process may be better understood, I have appended drawings showing one form of apparatus adapted for use in carrying it out.

In the drawings, Figure 1 is an elevation of a blast-furnace, A, melting-furnace B, and sectional view of a refining and converting chamber, C, said apparatus being adapted for use when the several steps of the process are blended. Fig. 2 is a sectional view of a two-chamber converter, R, indicating the refining or purifying chamber, and C the converting-chamber.

Like letters refer to like parts wherever used.

A indicates the blast-furnace where the ore is smelted; a, the runner or gutter leading to the refining and converting chamber; B, spiegeleisen or manganese smelting furnace; b, the runner or gutter leading thence to the refining and converting chamber.

The refining and converting chamber will have a port or opening, c, for introducing the molten metal, and valved pipes or conduits d for the escape of waste gases.

e indicates disks or cones supported on shafts f, journaled in pillars g, arranged in the refining and converting chamber. The different cones or disks may revolve in reverse directions. By these or equivalent devices the molten metal as it flows into the refining and converting chamber is broken up into sheets, or into a shower of small particles or globules. The wall of the chamber is pierced at different levels from top to bottom and all around with air-pipes h, on some of which are receptacles k, for pulverized refining substances to be introduced into the air-blast. If the chamber is for both refining and converting the metal, a series of gas jets or pipes, l, arranged around the air-pipes h, are provided, as also a series of air pipes or tuyeres, h', delivering through the bottom of the chamber.

T indicates a tapping, and S a slag port.

This apparatus forms no part of the present case, but is the subject-matter of case Serial No. 165,879, filed of even date herewith.

In apparatus of the general character described the molten metal is broken and whirled into sheets of spray, and while in this divided state is searched by cross-currents of air bearing pulverized basic material—such as iron oxide, ground magnesian limestone, pure lime, or any other suitable substance, and is speedily desiliconized, decarburized, desulphurized, and dephosphorized, being brought to the condition of a bath of refined metal, ready for recarburization. This recarburization can be then accomplished by running molten spiegeleisen, ferro-manganese, or other carburizing agent from the furnace B into the refining-chamber C, and allowing it to fall upon the revolving cones or disks e and be whirled into spray, in which condition it also is subjected to the action of cross-currents of air or gas and falls in a divided state into the molten bath of refined metal. If now a double refining (or refining and converting) chamber—such as shown in Fig. 2—has been provided, the molten mass may be again sprayed and subjected to cross-currents of air and gas, whereby a thoroughly-homogeneous steel of the exact grade required can be readily and speedily produced.

The foregoing description supposes that the refining and recarburizing steps of the process have been followed successively, and the metal more or less fully desiliconized and decarburized by the first step; but it is sometimes desirable to blend the two steps or conduct the two at the same time, which may be done by employing a refining-chamber—such as shown in Fig. 1, or the lower half of Fig. 2—provided with gas-tuyeres. This is the case where the crude molten metal is naturally low in silicon and the use of an oxidizing-blast would maintain the heat at the expense of a greater reduction of the carbon of the metal than was desirable, in which case, in order to maintain the temperature of the refining-chamber without loss of metal or material reduction of the carbon of the metal, and at the same time eliminate the silicon, sulphur, phosphorus, &c., carbonic-oxide or hydrocarbon gas are introduced simultaneously with the air and pulverized basic material. The molten metal is, as in the former case, run from the blast-chamber into the refining and converting chamber, where it is whirled into sheets and spray, in which condition it is searched by cross-currents of air freighted with fine basic substances and gas combined therewith, the gas being either carbonic-oxide or hydrocarbon gas, or both, and its volume and proportion being regulated by the effect to be produced. (The relative amount of air and gas introduced will depend on the quality of the metal, and will determine the nature of the flame in the refining and converting chamber, whether the same be oxidizing, neutral, or carburizing.) Under these conditions the desiliconization and purification of the molten metal will proceed without the same extent of decarburization which takes place where the steps are separate and successive, and the refined metal will contain the desired amount of carbon, if the air and gas blasts have been properly proportioned. If any error has occurred, or if it is desired to change the degree of carburization of the metal, the molten speigeleisen or other recarburizer can then be added, as hereinbefore specified, and the molten mass can be maintained at a dead melt by the combustion of gas in the refining-chamber above the same until a perfectly homogeneous steel is obtained, and one which will produce castings free from blow-holes and other imperfections. The length of time, the introduction of air and gas into the refining and converting chambers must be maintained, the volume and pressure thereof, and the amount of pulverulent basic material and recarburizer used, cannot be given in fixed figures, as they will vary according to the quality of the metal, (or ore,) and must be determined, as in the case of the Bessemer and open-hearth processes, by analysis of the materials, observance of the flames issuing from the refining-chamber, and tests of the molten metal taken from time to time, all of which are within the present knowledge of the practical metallurgist.

The advantages of my invention are simplicity, saving of time, labor, and material, and accuracy of the results obtained.

I am aware that concrete blooms, the constituent parts of which are partially purified and partially converted cast-iron and a metallic oxide, have been produced by allowing the molten crude iron to fall in a divided or spray form through an ascending column or air-blast freighted with finely-pulverized iron ore or other metallic oxides, and do not herein claim the same, as the metal is not refined as herein specified; but instead thereof the molten metal is partially oxidized, and in this condition carries the metallic oxide with it into the ingot, forming a conglomerate requiring further treatment in order to obtain refined metal.

I am also aware that the recarburizer has been added to the molten metal in fine molten streams, and do not herein claim such a method, as my object is to obtain a uniform homogeneous mass by adding the recarburizer in a diffused condition—such as a sheet of spray or rain form.

Having thus set forth the nature and advantages of my invention, what I claim, and desire to secure by Letters Patent, is—

1. The method herein described for refining and purifying iron and producing steel, which consists in subjecting the molten metal in a divided state—as in the form of sheets or spray—to the combined action of currents of air and gas freighted with pulverized basic substances, substantially as and for the purposes specified.

2. The method herein described for the manufacture of steel, which consists in subjecting the molten blast-furnace metal in a divided state or spray to the action of currents of air freighted with pulverized basic material, and then adding thereto the recarburizing agent in the form of molten spray, substantially as and for the purposes specified.

3. The process herein described for refining iron and producing a homogeneous steel therefrom, which consists in first subjecting the molten metal in a divided state—as in the form of sheets or spray—to the action of air-blasts freighted with pulverized basic material; secondly, recarburizing the bath by adding thereto the recarburizing agent in the form of a molten spray, and, finally, re-spraying the bath thus recarburized and subjecting it to air and gas currents, substantially as and for the purposes specified.

4. The method herein described for recarburizing the molten metal, which consists in introducing the recarburizer in the form of molten spray, substantially as and for the purposes specified.

In testimony whereof I affix my signature, in presence of two witnesses, this 5th day of May, 1885.

EUGENE F. FALCONNET.

Witnesses:
W. D. TALBOT,
GEO. E. PURVIS.